B. GRAHAM.
Churn.
No. 55,281.
Patented June 5, 1866.
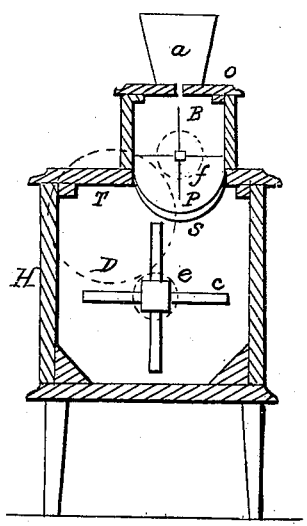
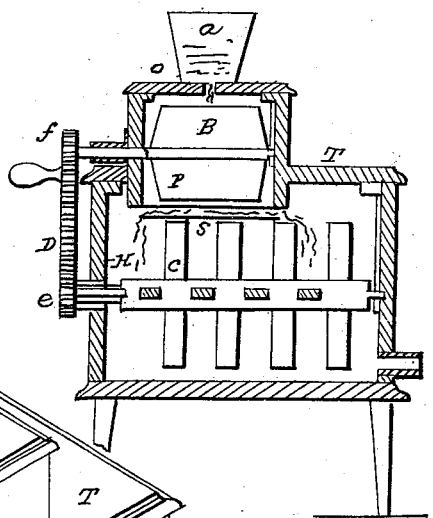
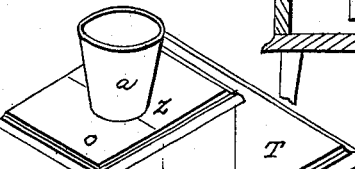
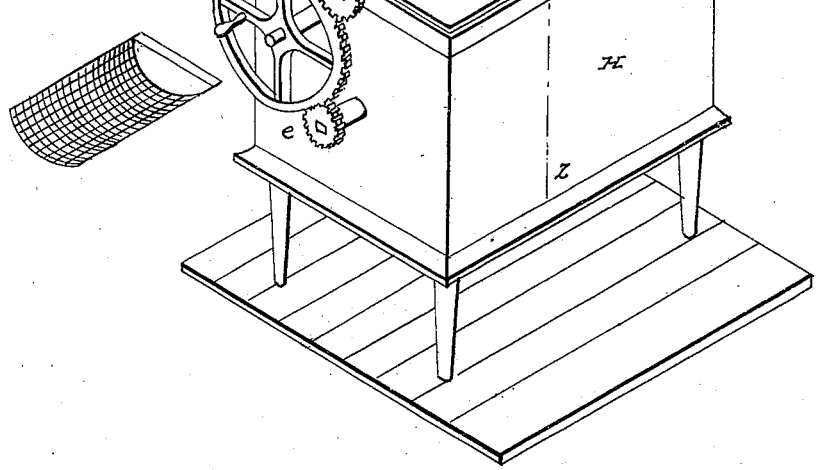
WITNESSES:
W. W. Sanborn
S. P. Melick
INVENTOR.
B. Graham

UNITED STATES PATENT OFFICE.

BENJAMIN GRAHAM, OF LYONS, IOWA.

IMPROVEMENT IN CHURNS.

Specification forming part of Letters Patent No. 55,281, dated June 5, 1866.

*To all whom it may concern:*

Be it known that I, BENJAMIN GRAHAM, of Lyons, county of Clinton, State of Iowa, have invented a new and useful Improvement in Dairy-Churns; and I do hereby declare that the following is a full, clear, and exact description of the construction and operation of the same, reference being had to the annexed drawings, making a part of this specification, in which—

Figure 1 is a perspective view; Fig. 2, a transverse section on line Z, Fig. 1; Fig. 3, a longitudinal section; Fig. 4, a view of the screen P in Figs. 2 and 3.

To enable others to make and use my invention, I will proceed to describe its construction and operation.

I construct the body of the churn H, dasher C, the cog-wheel D, and pinions $f$ and E, and vessel $a$ in the ordinary manner. I then attach to the shaft of the pinion $f$ a beater constructed of wood or metal, inclosing it in a box, as shown. The bottom of this box consists of a screen made of wire-cloth or anything that will answer its purpose. This screen is fitted on a circle, as shown at P, Fig. 2. Then below this screen a little distance I place a shield made of any material that will answer. This shield is also on a circle, as shown at S, Fig. 2, and extends in length just as far as the openings are in the screen, as shown at S, Fig. 3.

Now, the operation of my invention is as follows: I put the cream or milk into the vessel $a$, and by turning the wheel D a rapid motion is given to the beater B, which breaks the globules that contain the butter, the screen P preventing the cream from passing too rapidly into the body of the churn. The cream passes through the screen P onto the shield S, passing off from it at each end to body of churn. The shield prevents the dasher from forcing back any of the cream or butter into the screen P, thereby clogging its action.

The pinion $f$ is on a square shaft, and can be easily put in or out of gear. The caps O and T are easily removed, and thereby giving ample room to cleanse the various parts of the churn.

What I claim as my invention, and desire to secure by Letters Patent, is—

The beater B, the screen P, and the shield S, all for the purposes as above set forth.

B. GRAHAM.

Witnesses:
W. W. SANBORN,
S. P. MELICK.